April 9, 1940.  A. F. JOHNSON ET AL  2,196,676
FLEXIBLE CONNECTOR
Filed Sept. 23, 1937   2 Sheets-Sheet 1
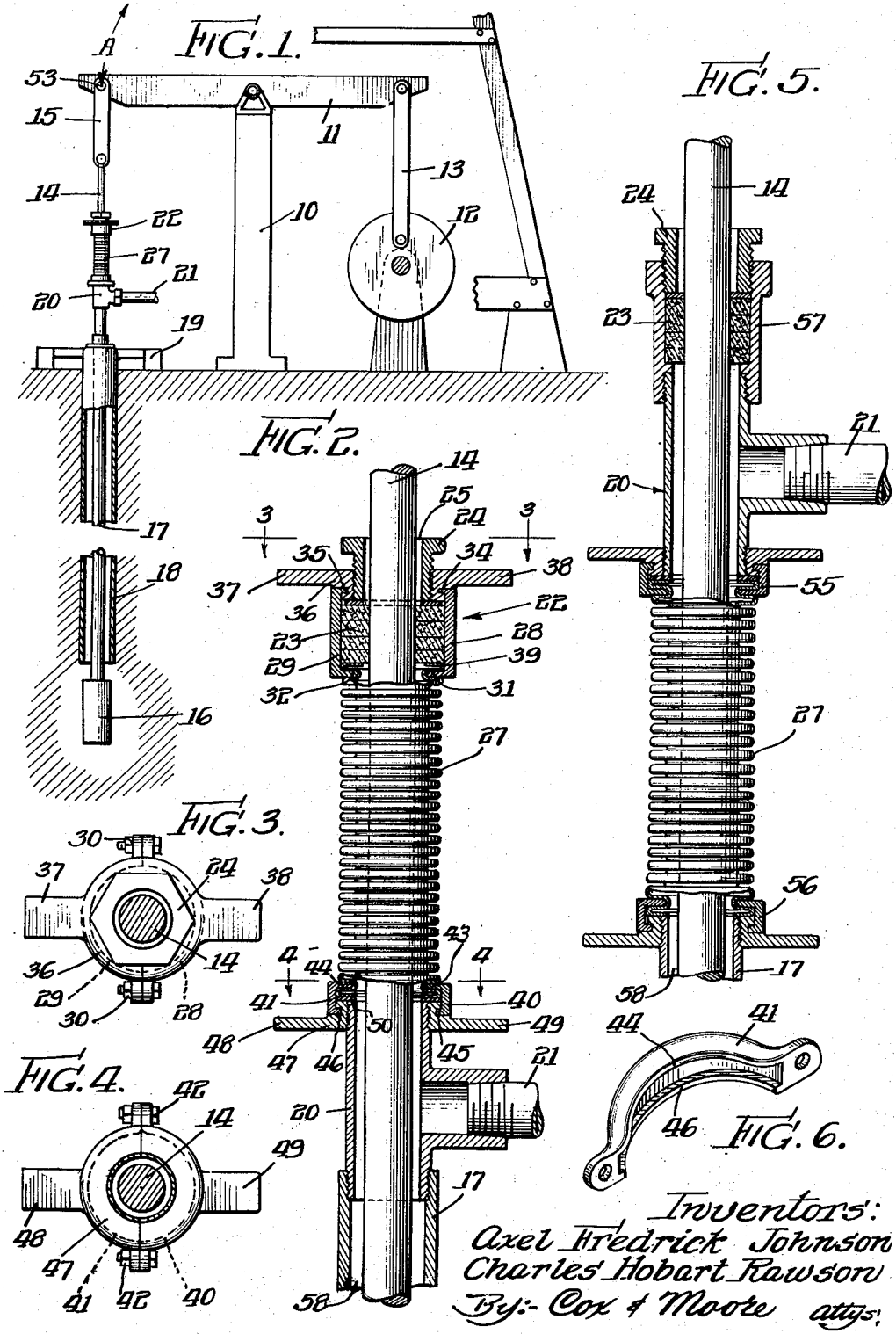
Inventors:
Axel Fredrick Johnson
Charles Hobart Rawson
By: Cox & Moore  attys.

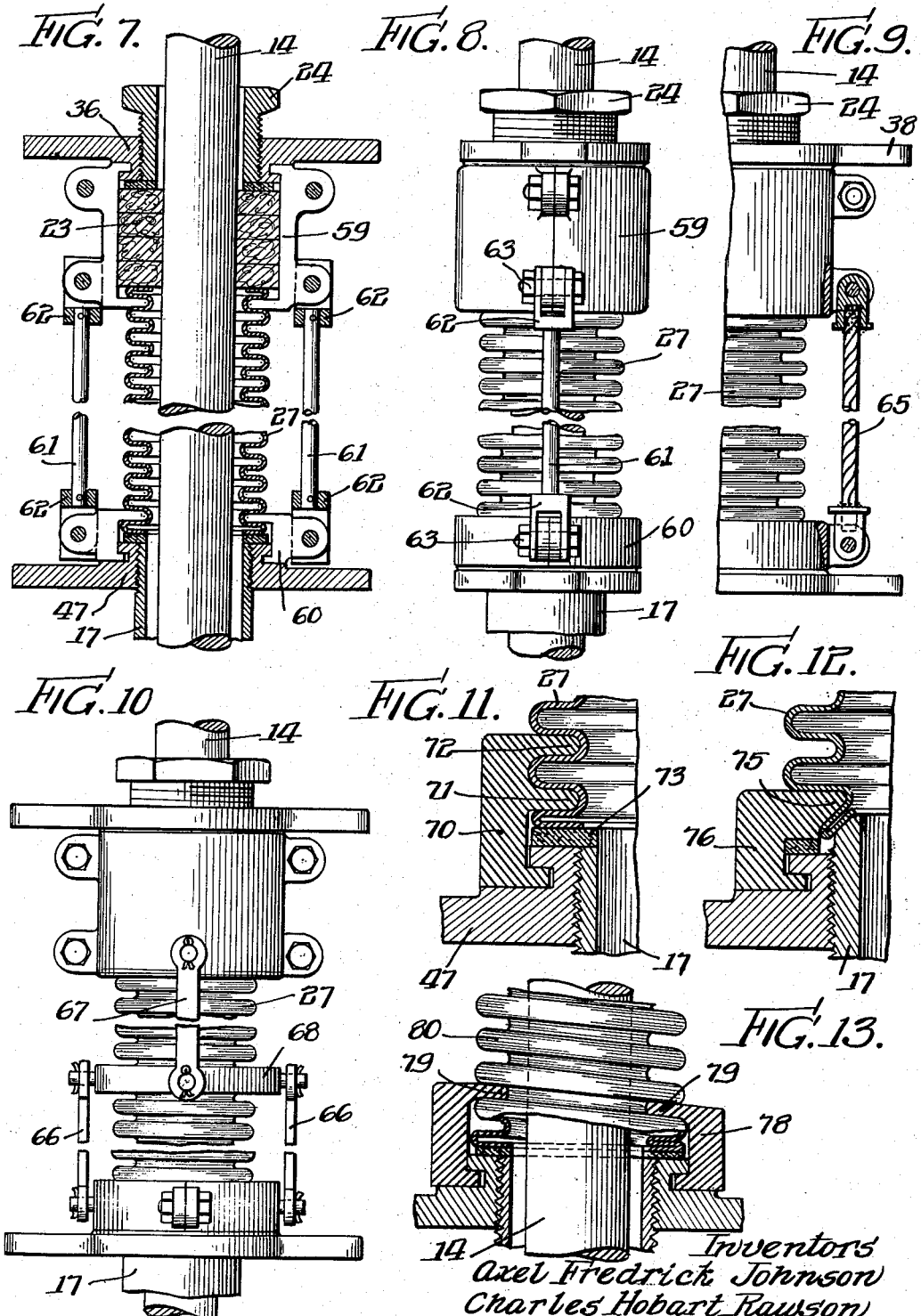

Patented Apr. 9, 1940

2,196,676

UNITED STATES PATENT OFFICE 2,196,676

FLEXIBLE CONNECTOR

Axel Fredrick Johnson, Chicago, Ill., and Charles Hobart Rawson, Tulsa, Okla., assignors to Chicago Metal Hose Corporation, Maywood, Ill., a corporation of Illinois Application September 23, 1937, Serial No. 165,360

10 Claims. (Cl. 286—15)

This invention relates to flexible connectors for pipe lines or like fluid handling installations wherein one part of the assembly is adapted to have movement relative to the other parts thereof.

In certain types of fluid handling apparatus or installations the various parts of the assembly experience, or tend to experience, relative movement which subjects the fluid handling parts to undue stress or strain when those parts are made sufficiently rigid to maintain tight fluid connections. For example, in oil well pumping apparatus the so-called polish rod, which is connected to and adapted to operate the pumping rods within the well, reciprocates within a stuffing box which is secured to and forms a part of the fluid conduit or piping which conducts the oil from the well. This piping must be securely anchored in position, and hence is stationary in the assembly. In conventional installations it has been customary to rigidly secure the stuffing box to the piping, so that the stuffing box likewise tends to remain stationary in the operation of the apparatus. The polish rod is secured at its upper end to and is operated from a power driven oscillating arm commonly referred to as a walking beam in certain types of installations, which, due to its pivotal mounting, not only imparts longitudinal reciprocation to the polish rod but also a certain amount of lateral or sidewise movement thereto. Accordingly, in conventional equipment undue frictional resistance is set up between the stationary stuffing box and the polish rod due to the fact that the stuffing box can not accommodate itself to the lateral movement of the rod during its longitudinal reciprocation. This undue friction leads to the consumption of unnecessary power, rapid wear of the parts, and frequent breakage induced by the undue stress and strain imparted to the apparatus by such friction. In accordance with the present invention the stuffing box is mounted so that it readily accommodates itself to the lateral movement of the polish rod. More specifically, the stuffing box is carried by a piece of flexible tubing which is interposed between the box and other parts of the oil conduit or piping whereby the stuffing box may readily accommodate itself to any lateral movement of the polish rod while the piping remains fixed or stationary. At the same time the connecting flexible tubing insures the maintenance of a fluid-tight assembly.

It is a primary object of the present invention to produce a flexible connector for pipe lines or like fluid handling equipment which will permit ready lateral movement between the fluid handling parts while maintaining a fluid-tight connection therebetween.

It is a further object of the invention to provide a flexible connector for relatively movable fluid handling parts which will readily permit the necessary movement between the parts whereby to reduce friction and strain therebetween, whereby to reduce wear and power consumption and minimize the likelihood of breakage.

More specifically, it is an object of the invention to provide a flexibly mounted stuffing box for oil well pumping equipment which will readily accommodate itself to the lateral movement of the polish rod.

It is a further object of the invention to provide a flexible connector which may be easily made, readily installed in fluid handling equipment, and which will be wholly durable and satisfactory in service.

Another object is to produce a flexible connector which will permit relative lateral movement of the connected parts and which will also withstand all necessary longitudinal stresses of tension and compression.

A still further and important object of the invention is to provide a coupling for flexible tubing and the like which will positively grip the tubing in a fluid-tight joint, and which may be assembled upon the tubing in the field without special tools. The coupling may be used with annular or spiral flexible tubing, with or without braid covering. It is of minimum length affording maximum flexible tubing length within the limits of the installation.

Still other objects and advantages of the invention will appear from the following specification when taken in connection with the accompanying drawings wherein certain preferred embodiments of the invention are illustrated.

In the drawings, wherein like reference numerals refer to like parts throughout:

Fig. 1 is a diagrammatic view illustrating an oil well pumping installation incorporating the present invention;

Fig. 2 is a partial sectional view of the flexible connector;

Fig. 3 is a transverse section on the line 3—3 of Fig. 2;

Fig. 4 is a transverse section on the line 4—4 of Fig. 2;

Fig. 5 is a view similar to Fig. 2 but showing a modified form of flexible connector;

Fig. 6 is a perspective view of one of the coupling clamp elements;

Fig. 7 is a longitudinal sectional view of a further modified form of flexible connector;

Fig. 8 is a side view of the connector of Fig. 7;

Figs. 9 and 10 illustrate further modified forms of connectors;

Figs. 11 and 12 are detail views of two modified forms of couplings for connecting the piping to the flexible tubing; and Fig. 13 is a similar view of a coupling for use with spiral flexible tubing.

In the drawings the invention has been illustrated as applied to an oil well pumping installation as it is particularly adapted for use in apparatus of this type. It is to be understood, however, that the flexible connector is also adapted for use in other installations wherein like problems are presented.

In Fig. 1 there is shown, somewhat diagrammatically, an oil well pumping apparatus comprising a frame 10 to which the walking beam 11 is pivotally secured. The beam is oscillated by the usual power crank mechanism comprising a crank 12 and a connecting rod 13 secured to one end of the beam. The other end of the beam is secured to the polish rod 14 by means of a link 15. The polish rod is in turn fastened to the column of pumping rods which operate the pumping element within the working barrel 16. The pumping rods are adapted to reciprocate in the usual manner within the piping 17 which forms the conduit for conducting the oil upwardly through the well. This piping is carried by and is rigidly secured to the well casing or housing 18, the piping and casing being supported by the frame 19 by the usual casing or tubing rings.

As will be seen more particularly by reference to Fig. 2, the piping 17 has a T connection 20 at its upper end to which the lead or flow line 21 is connected. The flow line is adapted to conduct the oil raised through the pipe 17 to a suitable reservoir or the like. In order to divert the oil into the flow line 21, and prevent it from flowing upwardly along the polish rod, a stuffing box 22 is provided within which the rod reciprocates. The stuffing box carries a plurality of rubber or packing rings 23 which tightly embrace the rod and prevent the flow of the pumped oil upwardly along the rod. The compression of the rings 23 may be adjusted by means of a packing nut 24 which serves not only as a means for adjusting the compression of the rings, but also forms a lubricating oil reservoir 25 along the rod which, when filled with lubricant, insures the provision of a constant flow of lubricant between the reciprocating polish rod and the packing rings.

In accordance with the present invention, the stuffing box 22 is carried at the upper end of a piece of flexible tubing 27 which, in the form illustrated, is a piece of seamless annular corrugated metal tubing. As will be seen more particularly by reference to Fig. 3, the stuffing box is formed of two semi-cylindrical sleeve members 28 and 29 bolted together by bolts 30. The sleeve members carry inwardly projecting flanges 31 and 32, respectively, which are adapted to engage with one of the annular corrugations in the tubing and which together form a continuous circular flange in firm interlocking engagement with the tubing corrugation. The sleeves 28 and 29 also carry inwardly directed flanges 34 and 35, respectively, which together form a continuous circular flange in engagement with a continuous groove formed in a manually operable swivel member 36 which carries oppositely extending handles 37 and 38. The swivel member is in threaded engagement with the packing nut 24. The packing nut may be rotated relative to the swivel member 36 to compress the packing rings 23 to any desired extent. Thereafter, any swiveling rotative movement of the swivel member with respect to the sleeves 28 and 29 will not disturb the adjustment of the packing nut so long as the latter rotates with the swivel member.

In assembling the stuffing box the two semi-cylindrical sleeve members 28 and 29 may be brought together bringing their inwardly directed flanges 31 and 32 into engagement with the corrugated tubing and their flanges 34 and 35 into engagement with the swivel member 36. The sleeves may be drawn up tightly into assembled position by means of the bolts 30. No special tools are necessary and the assembly may be readily completed in the field. As the packing nut is then drawn down, the packing rings compress the end convolution 39 of the tubing, effecting a very tight liquid seal between the end of the tubing and the packing rings, as well as between the packing rings and the reciprocating polish rod 14.

The lower end of the flexible tubing 27 is connected to the T member 20 by means of a pair of semi-circular clamps 40 and 41 forming a lower coupling connection for the flexible tubing. The clamps are held together by bolts 42 as in the case of the stuffing box sleeves. The clamps are provided with inwardly projecting upper flanges 43 and 44 forming a continuous circular flange which engages a corrugation of the tubing, and with lower inwardly directed flanges 45 and 46 which engage a circular recess formed in the manually operable swivel member 47. The swivel member is provided with handles 48 and 49 for rotating it relative to the coupling clamps and is in threaded engagement with the T member 20.

In assembling the lower coupling connection upon the flexible tubing, the flanges of the coupling clamps are brought into engagement with the proper corrugation of the tubing and with the circular recess in the swivel member 47, and are then secured in assembled relation by the bolts 42. The swivel member may then be rotated by means of handles 48 and 49 and threaded onto the end of the T member 20, forcing the T member against the end convolution of the flexible tubing and compressing the same into a firm fluid-tight joint. A gasket member 50 may or may not be provided as the occasion requires.

Referring to Fig. 1, it will be seen that the end of the walking beam to which the pumping rods are secured moves through an arc as indicated by the line A during the operation of the device. Normally, the point of connection 53 may be co-axially disposed with respect to the well casing. However, as the point of connection is raised along the arc A, a lateral component of movement, to the right in Fig. 1, is imparted to the connecting member 15 and to the upper end of the polish rod 14. Due to the flexible mounting of the stuffing box 22 in accordance with the present invention, the stuffing box is free to move sidewise to conform to the lateral positioning of the polish rod at all times during its reciprocating movements. By this means, friction between the stuffing box and the polish rod is reduced to a minimum, and power consumption is correspondingly reduced. Also, the life of the parts is increased due to less wear and no strains between the parts are set up which render them liable to rupture or breakage. No unbalanced wear upon the packing rings results, nor is the polish rod bent or distorted from normal condition. At the same time a wholly fluid-tight connection between the rigidly held T member 20 and the flexibly mounted stuffing box 22 is provided by the flexible tubing 27 and its associated coupling connections. The oil or other fluid being pumped is accordingly diverted through the flow line 21 from the well and can not leak upwardly along the polish rod nor through any of the coupling connections.

In Fig. 5 an alternate construction is illustrated wherein the T member 20 is disposed above the flexible tubing 27 and its associated coupling connections. In this instance the connections 55 and 56, provided at the upper and lower ends of the flexible tubing for connecting the tubing with the liquid conduits or piping, are similar to the connection provided at the lower end of the flexible tubing illustrated in Fig. 2 and may be assembled with respect to the piping and flexible tubing in the same manner. The stuffing box 57 is carried at the upper end of the T pipe and is provided with packing rings 23 and a packing nut 24, as in the embodiment first described. In this instance the entire piping assembly, comprising the T member 20, the flow or take-off line 21, and the stuffing box 57, is flexibly mounted at the upper end of the flexible tubing 27 whereby it may move freely laterally to conform to lateral movements of the polish rod 14. The flow line 21 need not be rigidly held in position as in the case of the lower well pipe 17, as the pipe 21 merely empties into a reservoir or the like. If necessary, as in the case where an extended piping connection is desired, the pipe line 21 may have interposed in it a piece of flexible tubing coupled to the pipe in the manner illustrated in Fig. 5, wherein the flexible tubing 27 is interposed between the pipes 17 and 20. In either the embodiment of the invention illustrated in Fig. 2 or that illustrated in Fig. 5, the stuffing box is flexibly mounted so that it conforms with the lateral movements of the polish rod, and a spacing is provided between the polish rod and the fixed piping, as indicated at 58, for the passage of the fluid and to avoid any interference between the lateral movements of the rod and the fixed piping connections. This spacing may be increased or decreased at will depending upon the requirements of the installation.

In Fig. 7 there is illustrated an embodiment of the invention, generally similar to that shown in Fig. 2, except that the upper and lower coupling connections 59 and 60 for the flexible tubing are secured together by rods or bars 61. The rods are provided with yokes 62 at their upper and lower ends which are pivotally secured to the couplings by the same bolts 63 which hold the two semi-circular parts of the couplings together. The upper coupling assembly is provided with packing rings 23 and a packing nut 24, and provides a flexibly mounted stuffing box as in the embodiments previously described. Due to the fact that both couplings are free to swivel or rotate to any desired position without disturbing the threaded connection between the fixed pipe 17 and the swivel member 47, or between the upper swivel member 36 and the packing nut, the bolts for the upper and lower couplings may be readily alined and the rods 61 secured in proper position. Also, the couplings may be rotated to bring the rods into the plane in which the principal movement of the polish rod occurs. For example, with the positioning of the rods shown in Fig. 7, the principal movement of the polish rod would be to the right and left. Bolts 63 need be tight enough only to hold the coupling parts together, and when so adjusted the yokes 62 can pivot relatively freely thereon, sufficient to permit the necessary lateral movement of the stuffing box. If a wholly free pivotal action is desired, the yokes 62 may be secured to the couplings by additional pivot pins in the manner illustrated in Fig. 10, or freely acting conventional ball and socket connecting means may be employed for securing the rods to the couplings. The rods 61 absorb all stresses of tension and compression due to the friction between the packing rings and the polish rod during its reciprocation and relieve the flexible tubing 27 of these stresses of compression and elongation.

In Fig. 9 a similar arrangement is provided except that a metal cable 65 is substituted for each of the rods 61. The cable will absorb all stresses of elongation or tension and may be used in installations where the flexible tubing can withstand the forces of compression.

In Fig. 10 a further embodiment of the invention is illustrated wherein bars 66 and 67, secured in suitable manner respectively to the lower and upper couplings and to a common connecting ring 68, are provided for absorbing the stresses of tension and compression. In this embodiment the bars 66 and 67 with the ring 68 in effect form a universal joint, leaving the upper coupling or stuffing box free to move laterally in any direction with the polish rod, and at the same time forces of compression and elongation are absorbed and removed from the flexible tubing.

In Fig. 11 an alternate means for securing the piping to the flexible tubing member 27 is illustrated. In this instance the coupling body member 70 is provided with two flanges 71 and 72 for engaging the tubing convolutions, rather than with a single inwardly directed flange as in the embodiments previously illustrated. This arrangement may be desirable where a stronger grip upon the tubing is desired. Either in the single or double flange arrangement, the tubing may be provided with a metal braid or the like if desired, in which event the braid will be forced inwardly into the tubing convolutions by the inwardly directed coupling flanges, a tight and positive grip between the coupling and the tubing being maintained. The gasket member 73 may or may not be provided as desired.

In Fig. 12 an embodiment of the invention is illustrated wherein the inwardly directed flange 75 of the coupling body 76 is provided with a tapered lower surface, and the end of the pipe 17 is correspondingly tapered. In this form of the construction the end of the flexible tubing 27 will be bent into a tapered or conical shape as illustrated, when the coupling parts are forced together.

In any of the coupling constructions above described the inwardly directed flanges which engage the tubing convolutions may be preformed and brought into engagement with the tubing when the two semi-circular coupling parts are bolted together, or the flanges may be depressed or bent into engagement with the tubing convolutions as described in the co-pending application of Axel Fredrick Johnson, Serial No. 117,740, filed December 28, 1936.

In Fig. 13 a coupling embodiment is illustrated wherein the coupling body 78 is provided with a spirally arranged inwardly directed flange 79 to engage a piece of spiral or helical corrugated flexible tubing 80.

In each of the described couplings the coupling connection itself is of a minimum thickness allowing the use of a maximum length of flexible tubing to afford maximum flexibility within the size limits of the installation. In each case the coupling is secured to the flexible tubing with a positive grip, providing a fluid-tight joint. The invention thus in effect provides a flexible connector or compensator for connecting two fluid handling parts, allowing ready relative movement between them while at the same time insuring the maintenance of fluid-tight connections.

It is obvious that various changes may be made in the embodiments specifically illustrated and described without departing from the spirit of the invention. The invention, accordingly, is not to be limited to the embodiments shown and described but only as indicated in the following claims.

The invention is hereby claimed as follows:

1. A flexible connector for hydraulic apparatus comprising a fluid conduit, a stuffing box assembly, a flexible metal tubing, fluid-tight coupling means for securing one end of said tubing to the conduit, fluid-tight coupling means for securing the other end of the tubing to the stuffing box assembly, and means in addition to the tubing connecting said coupling means, said additional connecting means having a pivotal axis substantially within the length of the tubing whereby to provide for relative lateral movement between the coupling means transversely of the tubing in at least one plane of movement while preventing movement of the coupling means longitudinally of the tubing.

2. A well pumping apparatus comprising a fixed riser pipe, a flexible metal tubing connected at one end to said pipe, a T member secured to the other end of the flexible tubing, a lead line connected to said T member, a stuffing box also connected to said T member, a polish rod assembly adapted for reciprocation within said stuffing box and through said T member, flexible conduit and riser pipe, and means for reciprocating the rod assembly.

3. A flexible connector comprising a flexible metal tubing, a coupling secured to one end of the tubing, a coupling secured to the other end of the tubing, and means in addition to the tubing connecting said couplings, said additional connecting means having a pivotal axis substantially within the length of the tubing whereby to permit relative lateral movement between the couplings transversely of the tubing in at least one plane of movement while preventing separation of the couplings longitudinally of the tubing.

4. A flexible connector comprising a flexible metal tubing, a coupling secured to one end of the tubing, a coupling secured to the other end of the tubing, and a pair of strut members connected to said couplings on opposite sides of the tubing, said strut members having a pivotal axis substantially within the length of the tubing whereby to permit relative lateral movement between the couplings transversely of the tubing in at least one plane of movement while preventing separation of the couplings longitudinally of the tubing.

5. A flexible metal connector comprising a flexible tubing, a coupling secured to one end of the tubing, a coupling secured to the other end of the tubing, and a pair of longitudinally inextensible flexible members connected to said couplings on opposite sides of the tubing.

6. A flexible corrugated connector comprising a flexible metal tubing, and swivel coupling connections at each end thereof, one of said coupling connections comprising a pair of complementary semi-circular members having means engageable into the corrugations of said tubing, and means for holding said members in assembled position upon the tubing.

7. A flexible connector comprising a flexible metal tubing, swivel coupling connections at each end thereof, and means extending longitudinally of the tubing for connecting the coplings, said coupling connecting means having a pivotal axis substantially within the length of the tubing whereby to permit relative lateral movement between the couplings transversely of the tubing in at least one plane of movement while preventing separation of the couplings longitudinally of the tubing.

8. In a flexible connector, a flexible corrugated metal tubing, and a swivel pipe coupling at one end thereof, said coupling comprising a pair of semi-circular coupling body members, means for clamping said members together, inwardly directed flanges on said members in engagement with a corrugation of the tubing, a screw threaded swivel member, an annular groove in said swivel member, and inwardly directed flanges on the body members in swiveled engagement with said groove.

9. A coupling connection as in claim 8 wherein the coupling body members are provided with a plurality of flanges in engagement with a plurality of corrugations of the tubing.

10. A flexible connector comprising a flexible metal tubing, coupling connections at each end thereof, said coupling connections comprising a pair of complementary semi-circular members having means engageable within the corrugations of said tubing, and means extending longitudinally of the tubing for connecting the couplings, said coupling connecting means having a pivotal axis substantially within the length of the tubing whereby to permit relative lateral movement between the couplings transversely of the tubing in at least one plane of movement while preventing separation of the couplings longitudinally of the tubing.

AXEL FREDRICK JOHNSON.
CHARLES HOBART RAWSON.